June 13, 1950

F. R. EDDY 2,511,104

APPARATUS FOR INDICATING DIFFERENTIAL
SPEEDS OF ROTATING ELEMENTS

Filed June 26, 1947

INVENTOR:
FORREST R. EDDY,
BY:
Donald G. Dalton
HIS ATTORNEY.

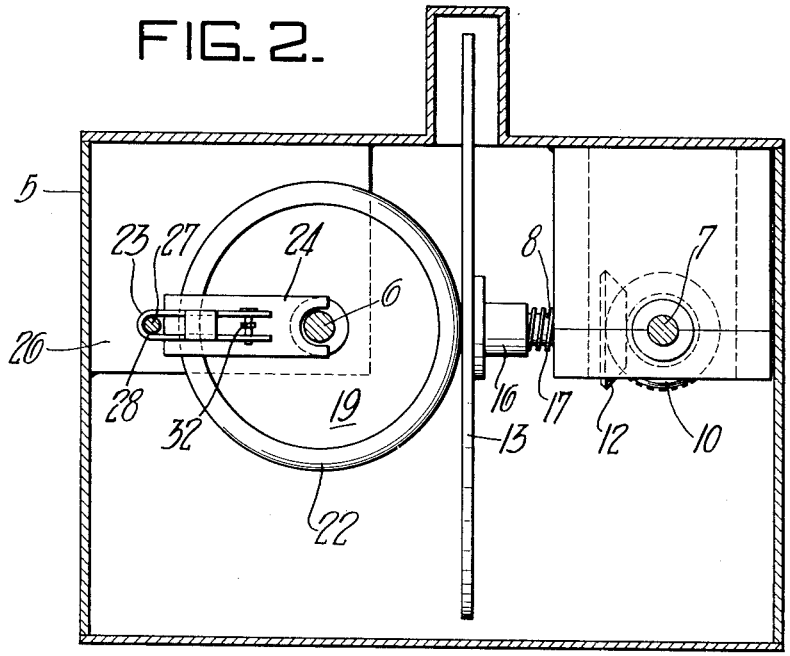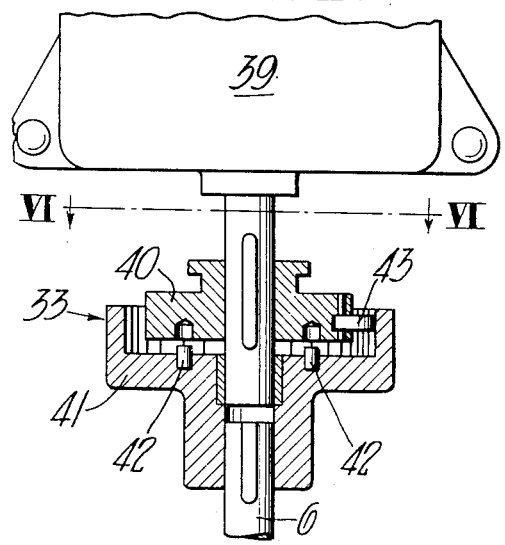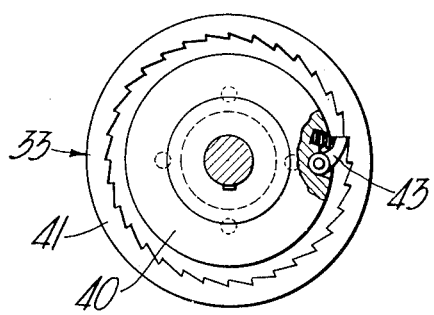

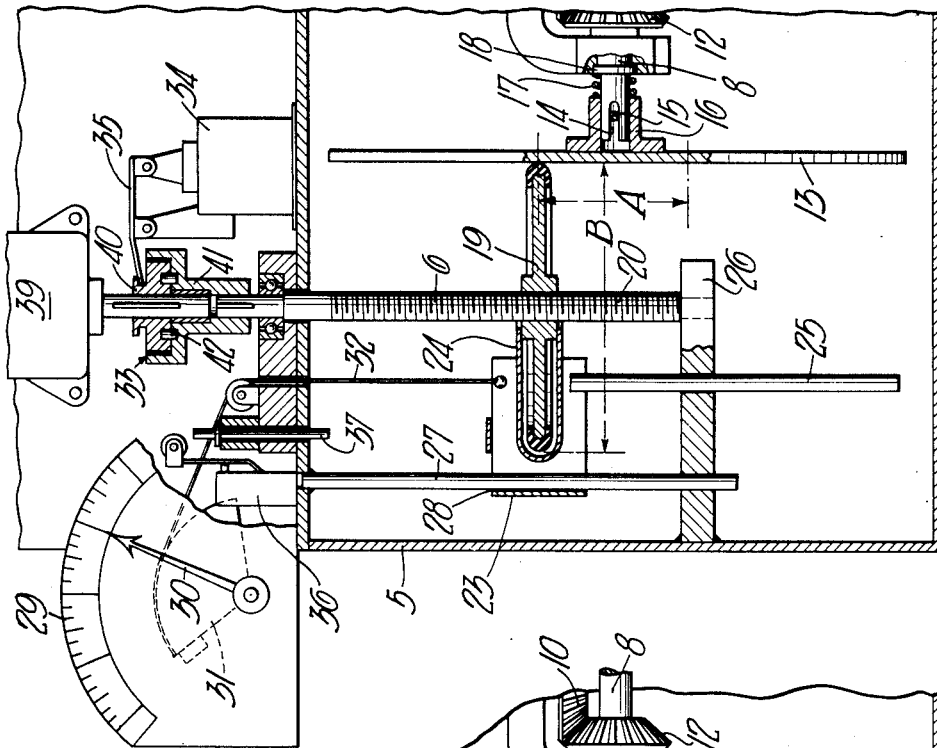
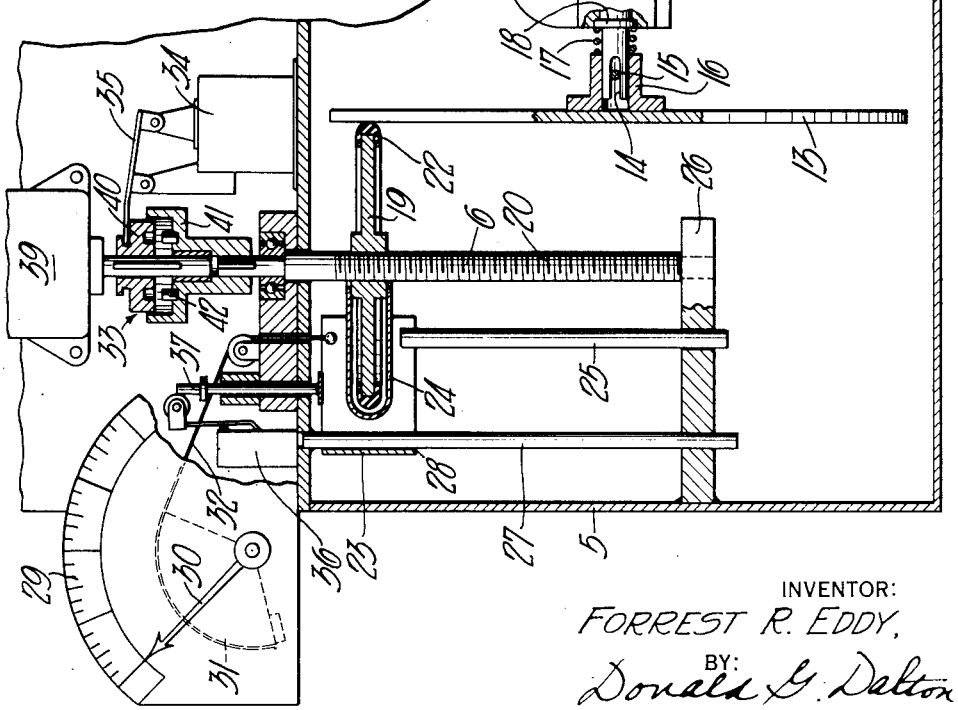

June 13, 1950     F. R. EDDY     2,511,104
APPARATUS FOR INDICATING DIFFERENTIAL
SPEEDS OF ROTATING ELEMENTS Filed June 26, 1947     4 Sheets-Sheet 4

INVENTOR:
FORREST R. EDDY,
BY Donald G. Dalton
HIS ATTORNEY.

Patented June 13, 1950

2,511,104

UNITED STATES PATENT OFFICE 2,511,104

APPARATUS FOR INDICATING DIFFERENTIAL SPEEDS OF ROTATING ELEMENTS

Forrest R. Eddy, Gary, Ind., assignor to Carnegie-Illinois Steel Corporation, a corporation of New Jersey Application June 26, 1947, Serial No. 757,240

1 Claim. (Cl. 235—103.5)

The invention, as will hereinafter more fully appear, comprises an indicating device for indicating variations in ratios between the rotating speeds of two elements and more particularly to a device which shows such variations on direct reading dials or gauges. Such a device is adapted for many applications in connection with machines and processes wherein it is important to maintain speed ratios within critical limits.

A troublesome problem confronting machine designers and managerial personnel charged with the responsibility of production of various types of machinery, is the lack of a reliable means for accurately indicating or registering speed ratios or speed differences between interrelated rotating parts of a given machine or of two or more related machines. The problem is complicated where it is desired to know the speed ratio differences of different machines or different parts of machines, especially if some of the machines or parts are capable of being driven at variable speeds. The present invention makes it possible to determine speed differences and to indicate the same on dials or gauges which can be easily and quickly read, thus eliminating the necessity of resorting to mathematical computations as was necessary prior to the present invention.

Prior art devices or mechanisms for determining relative speed changes between different machines or different parts of the same machine have been unsatisfactory or objectionable because of inaccuracy, slow response, lack of easily read positively registering means and their inability to function properly when there were small variations of the speeds whose relationships were to be ascertained.

One object of the present invention is to overcome the above problems and to eliminate the disadvantages inherent in prior art mechanisms.

A further object is to provide a differential indicator capable of detecting and showing speed differences in an accurate manner and which will be reliable in use and comparatively simple and inexpensive to manufacture.

Another object is to provide an indicator including coacting instrumentalities which function accurately to distinguish extremely small speed differences between related rotating elements and to accurately indicate or register such speed differences.

A further object is to so construct and arrange the component parts of the speed differential indicator so that they function in a quickly responsive manner to detect speed differences and to show or register such differences on an easily readable dial or gauge.

As will hereinafter more fully appear, the above and related objects are obtainable by using a pair of circular discs adapted to be rotated at speeds equivalent to or bearing a direct proportion to those of the rotating elements it is desired to check. The discs are positioned with their axes 90° apart and arranged in such a manner as to establish frictional driving contact between the periphery of one and the face of the other.

The driven disc, which is the smaller of the two, is provided with an internally threaded bore engaging a threaded supporting shaft, the combination furnishing means for establishing feeding action between the two in direct relation to their rotating speeds. Since rotation of the driven disc is regulated by its contact with the driving disc at a speed equivalent to one of the elements being checked; and rotation of the threaded shaft of the driven disc is responsive to the speed of the other element; there will be no feeding action between the disc and shaft when the speeds of the two elements are the same.

However, if the speed of the driven disc is increased to a faster rate as compared to that of its threaded shaft, feeding action occurs between them and continues until their respective speeds again match. Feeding or shifting action of the disc is reflected in corresponding movement of a pointer thus indicating the extent of movement on a suitably graduated dial.

The invention will be more fully apparent from the following detailed description and the appended claims when read in connection with the accompanying drawings in which:

Figure 2 is a horizontal sectional view of the apparatus taken at line II—II of Figure 1;

Figure 3 is a sectional view showing one extreme position of the indicator parts;

Figure 4 shows another position assumed by the various parts when the indicator is functioning under normal conditions;

Figure 5 is a detail of an overrunning clutch;

Figure 6 is a section on line VI—VI of Figure 5; and

Figure 1:
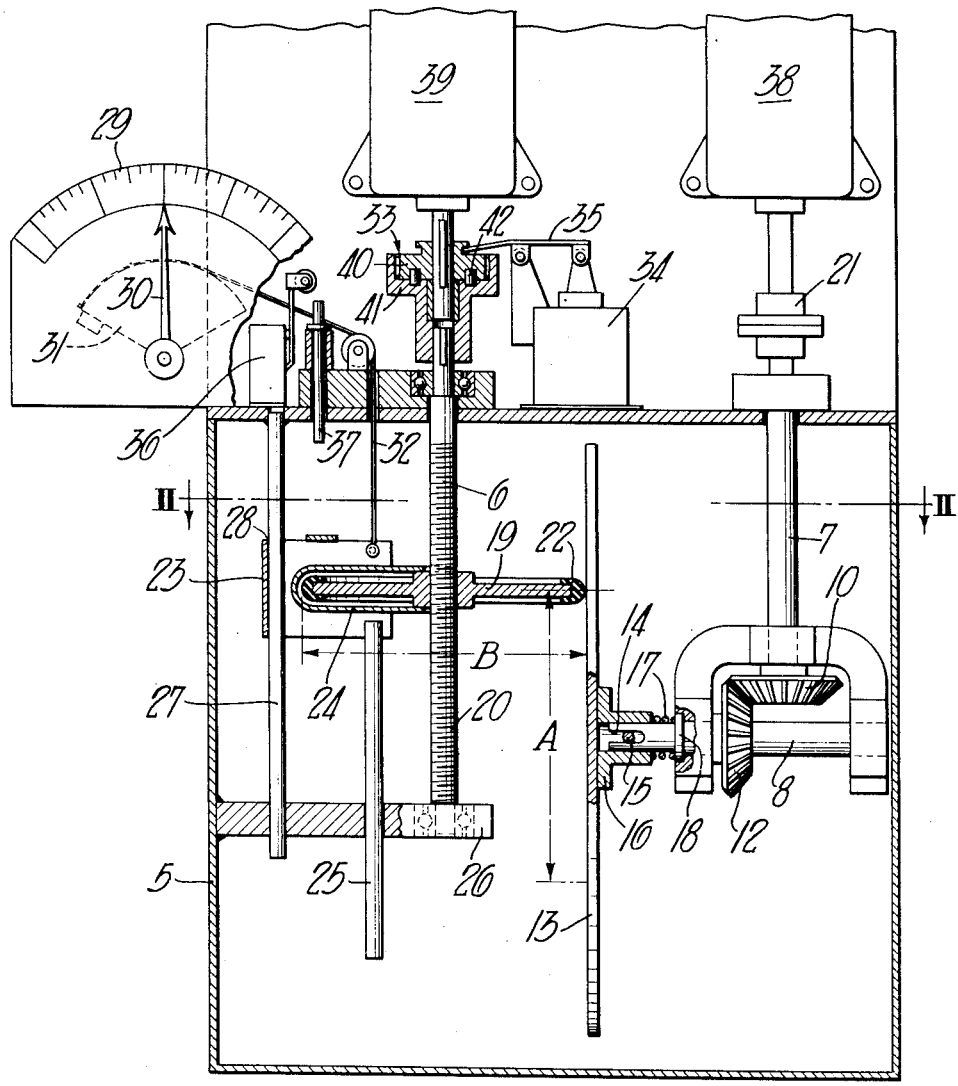
Figure 1 is a vertical sectional view showing the general arrangement of the component parts of the indicator.

Referring to Figure 1, the indicator case 5 contains two parallel shafts 6 and 7, and a third or right angle shaft 8, all mounted in suitable antifriction bearings. Shaft 7 is equipped with mitre gear 10 for driving matching gear 12 keyed to shaft 8, the latter rotating disc 13 through the pin and slot connection shown and more fully described below.

Shaft 8 is formed with a driving slot 14 substantially as shown, adapted to receive driving pin 15 extending through bore of hub 16, and the resulting combination of parts described will transmit motion to and revolve the disc 13.

A spring 17 is loosely contained on extending portion of shaft 8 between a thrust collar 18 and a hub 16, the spring continuously exerting slight forward pressure against the disc 13 in order to insure frictional driving contact at all times between the face of the latter and a coacting driven disc 19. Should slipping occur between the discs 13 and 19 it will in no way affect the efficiency or accuracy of the indicator. If proper care is used in assembling the indicator, the force required to rotate the disc 19 would be negligible as it normally moves at the same speed as its supporting shaft 6. Abrupt changes in speeds transmitted to the indicator may in extreme cases cause momentary slippage but the degree or extent of the same would not be harmful.

The shaft 6 is threaded to accommodate the hub of disc 19 and the latter is provided with a rim 22 composed of semi-hard rubber or other suitable material, capable of transmitting relative motion of the disc 13 to the disc 19.

A yoke 23 is equipped with two extending arms 24 which span the hub of disc 19 and maintain light, easy, sliding contact with the latter during either vertical or rotating movement. The yoke 23 is guided in its movement by bar 25 and support 26; and a pin 27 which slidably engages the opening 28 in the yoke.

The indicating means includes a graduated dial 29 and a pointer 30 which is attached to sheave segment 31, the latter being adapted to receive cable 32 and thus be responsive to and indicate movements of the yoke 23.

Not shown on the drawing are two transmitters positively driven by the elements whose speed it is desired to check. The transmitters motivate receivers 38 and 39 which are connected to shafts 7 and 6, respectively, by a coupling 21 and an overrunning clutch 33. The arrangement described includes the use of electrical and mechanical means in common use which are not claimed as part of this invention. The transmitters and receivers referred to are the type of equipment ordinarily used to transfer motion electrically between points which cannot be readily connected mechanically. Operation of the receivers is definite, and at all times in agreement with the transmitters, caused by the circulating currents which produce synchronizing torque in the respective units.

The combination overrunning clutch and coupling normally provides positive driving means similar in effect to an ordinary coupling. When the two halves are separated however, the driven half can be rotated slower than the driving half; but not faster; and the driving half can overrun the driven half if the latter rotates slower, or stops. Functioning of the clutch-coupling 33 will be better understood by referring to the enlarged view in Figure 5 which shows it disengaged. In this view driving member 40 has become separated from the driven member 41 a distance sufficient to insure that there will be no driving action by pins 42. In this condition the driving member 40 can rotate at speeds in excess of the driven member 41, but member 41 cannot rotate faster than member 40 due to snubbing action of ratchet 43. Briefly, the coupling 33 as applied to the indicator of this invention, is capable of driving in one direction only, or when its two members are in engagement with each other.

Rotation of shafts 6 and 7 may be in either direction as long as the shafts rotate in opposite directions. If rotation of shaft 6 is clockwise as viewed from above, threads 20 are right hand threads, or if counter-clockwise, the threads are left hand threads.

In Figure 1 the elements being checked for speed differences are rotating at the same speed and the parts of the indicator mechanism have assumed balanced relationship, with the pointer at its center position. Disc 19 has assumed relative position with respect to disc 13 whereby speed of disc 19 will be the same as the speed of the diameter of its point of contact with disc 13.

All parts of the indicator are rotating in synchronism and consequently no feeding or screwing action occurs between disc 19 and shaft 6. As a result, yoke 23, which is responsive to vertical movements of disc 19, remains stationary and pointer 30 occupies the center position on dial 29, thus indicating that rotating speeds of the elements being checked are identical. These conditions are not affected by the rate of speed at which the elements are operated.

In Figure 4 the elements being checked are not rotating at the same speeds and parts of the indicator have changed position to register the differences in the following manner. The element connected to shaft 7 in this instance is rotating faster than the element of shaft 6, consequently disc 19 will tend to rotate at a correspondingly increased rate by virtue of its peripheral contact with face of disc 13. Since the speed of screw shaft 6 has not changed it will be rotating slower than shaft 7, consequently a relative feeding motion occurs between disc 19 and screw shaft 6 caused by the increased speed of disc 19 mentioned above.

The speed differential existing between faster rotating disc 19 and slower rotating screw shaft 6 causes disc 19 to unscrew and feed downwardly causing corresponding movement of yoke 23. This movement continues until disc 19 reaches a path of contact on the face of disc 13 where the speed of disc 19 will match the speed of shaft 6, at which point feeding action ceases. Since in this case the speed of shaft 7 is faster than that of screw shaft 6, the diameter A of the path of contact established by disc 19 on disc 13 is appreciably smaller than the diameter B of disc 19.

Changes in the relative positions of discs 19 and 13 are continuously registered by corresponding movement of pointer 30 with respect to dial 29 and in this instance the combination of conditions above described and shown in Figure 4 will cause the pointer 30 to register at a point to the right of the dial center. It should be apparent that if shaft 7 was rotating slower than shaft 6 opposite conditions to those above described will exist. In the latter case disc 19 would feed upwardly until it reaches a position on shaft 6 where their speeds matched, and the pointer would register to the left of the dial center. Dial 29 may be graduated in any units desired, for example ratios or percentage variation from normal speed. The spacing of graduations follows a hyperbolic relation.

Figure 3 shows related positions of the indicator parts when the rotating elements being checked have undergone speed changes beyond the normal functioning capacity of the device. The changes referred to may include extremely high or low speeds, or complete stoppage of the elements, any of which are responsible for either upward or downward feeding movement of disc 19. These changes or conditions may be generally considered as occurring in one of the following instances:

Upward feeding:
 (A) When 7 stops.
 (B) When 7 rotates extremely slow.
 (C) When 6 rotates extremely fast.
Downward feeding:
 (D) When 6 stops.
 (E) When 6 rotates extremely slow.
 (F) When 7 rotates extremely fast.

*Case A.*—When 7 stops, both discs no longer rotate, but since 6 is still rotating, a full feeding action takes place between it and 19 causing the latter to travel upwardly to the position substantially as shown in Figure 3. To prevent overtravel of 19 to an extent where it loses peripheral contact with 13, rendering the indicator unoperative upon return of the rotating elements being checked to normal rotating status, feeding action is halted by stopping rotation of 6 in the following manner:

When disc 19 and yoke 23 near the upper limit of travel, yoke 23 engages plunger 37 which is free to move vertically. Upward movement of 19, 23 and 37 continues until plunger 37 closes a switch 36 completing an electrical circuit which energizes a solenoid 34, which in turn functions to disengage coupling 33 which will then no longer drive shaft 6. As a result, feeding action ceases and 19 becomes motionless although still maintaining contact with 13, which in this instance is motionless also.

Should shaft 7 start rotating again, both discs and shaft 6 will respond by rotating also. Since shaft 6 preferably is mounted in relatively frictionless bearings (Figure 1), rotation of disc 19 also rotates shaft 6, rather than advancing the disc along screw threads 20. Therefore at this point screw shaft 6 will be rotated at a maximum speed relative to shaft 7. The speed difference between receivers 38 and 39 decreases until it falls within the operating range of the indicator or to a point where the speed of shaft 6 (and coupling 41) matches that of coupling 40. Since shaft 6 is prevented from rotating faster than clutch member 40 by ratchet 43, the excess in speed of disc 19 over screw shaft 6 results in downward feeding action of disc 19 along screw threads 20. Further downward movement of disc 19, yoke 23 and plunger 37 will cause the latter to open switch 36 and deenergize the solenoid 34 whereupon coupling members 40 and 41 will re-engage and pins 42 will again provide positive drive. The downward movement of disc 19 continues until the circumferential speed of the path of contact between it and disc 13 causes disc 19 to rotate at the same speed as disc 6 whereupon feeding action between them stops and the indicator will register the difference in rotating speeds of the two elements being checked.

*Case B.*—The above performance will also occur should shaft 7 rotate extremely slower than 6 and feeding action would be stopped in the same manner. In this case however, upon disengagement of coupling 33, only the upward movement of disc 19 would cease whereas its rotation would still continue for the reason that shaft 7 and disc 13 were still rotating.

*Case C.*—In this case the indicator would also undergo changes similar to those in A and B when shaft 6 was rotated at an extremely faster rate than shaft 7. When coupling 33 became disengaged in this instance, the excess in speed of screw shaft 6 would be taken care of by the overrunning feature incorporated in the coupling.

*Case D.*—When shaft 6 stops, disc 19, which is rotating, immediately starts feeding downwardly and will continue to do so until its path of contact with disc 13 reaches the center of the latter whereupon disc 19 will stop rotating and there will be no further feeding action. If screw shaft 6 were to start rotating again, 19 would feed upwardly until the circumferential speed of the path of contact between the two discs caused 19 to rotate at the same speed as screw shaft 6. At this point feeding action would stop and the indicator would register the difference in speeds between the rotating elements being checked.

*Case E.*—The action described in D will reoccur should shaft 6 rotate at an extremely slower rate than shaft 7 and feeding action would be accomplished in the same manner.

*Case F.*—When shaft 7 rotates at an extremely faster rate than shaft 6, the parts of the indicator function the same as described in D.

Figure 7:
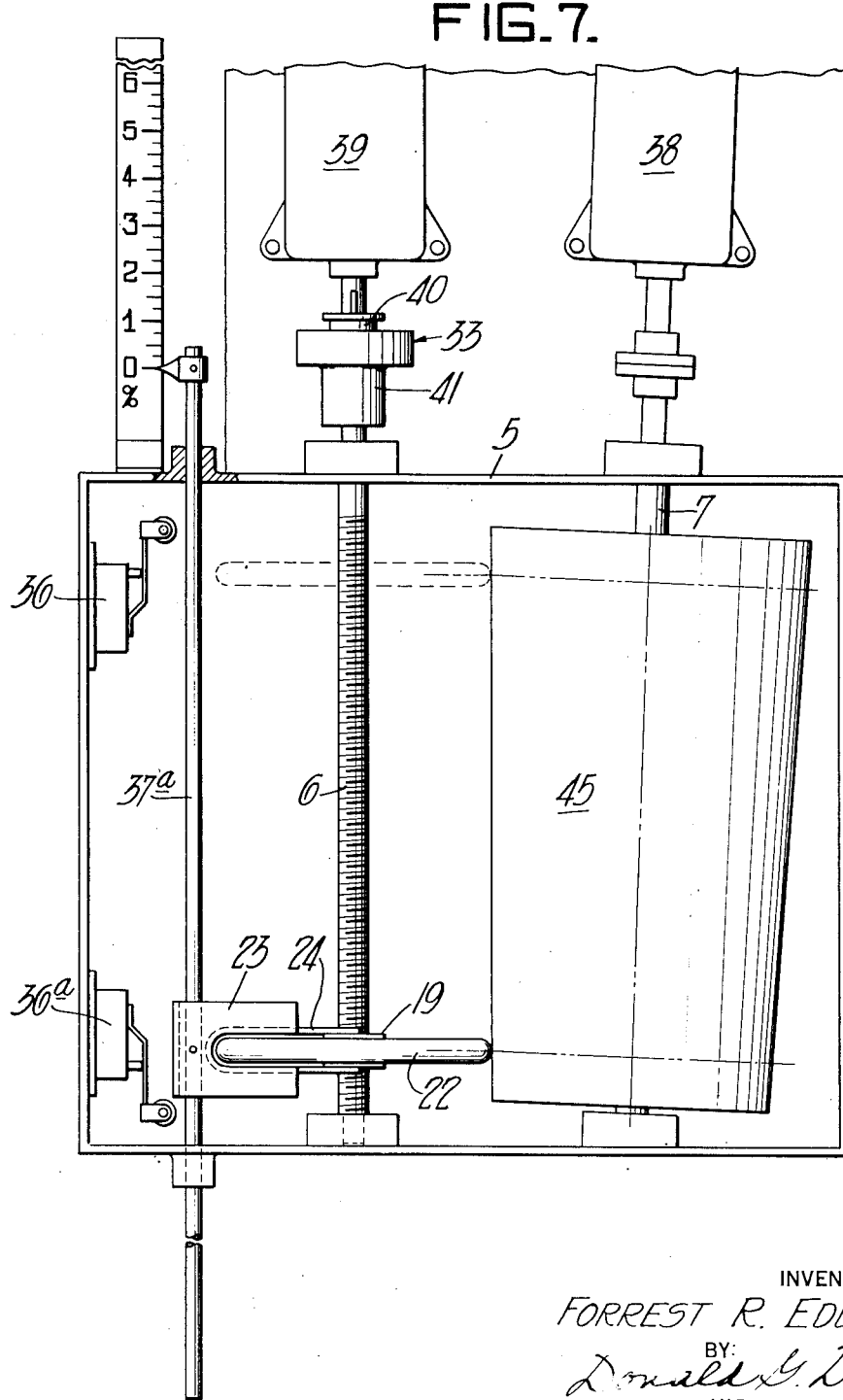
Figure 7 is a view showing a modification in construction and arrangement of the differential mechanism for registering extremely small increments of speed differences.

In Figure 7 there is shown a variation in construction for indicating small differences in rotating speeds. The principle of operation is generally the same as previously described except that a tapered drum 45 has been substituted in place of disc 13. The difference in diameters of the drum between the lower and higher limits is 10% or 6.6 inches minus 6 inches which is equal to .6 inch. Since the usable axial length of drum 45 is 10 inches, it is apparent that each progressive inch of axial distance represents a diameter increase of .06 inch or 1%.

Since it has been explained previously how speed differences affect movement of disc 19, it is quite obvious therefor that in this case such movements will be duplicated, the only major difference being that speed differences will be registered in percentage instead of revolutions. The graduations of the dial or gauge in this case however are in major increments of one inch each which corresponds to one inch travel (or movement) of disc 19, or one percent difference in the speeds of the rotating elements being checked. In the gauge shown in Figure 7 each separate graduation of one quarter of an inch represents a speed difference of one quarter of one percent.

In this modification it would be necessary to use a differently designed coupling in place of 33 because there is normally no immovable point on the drum 45 for the disc 19 to reach in order to prevent overtravel. It is also preferable to use multiple threads on disc 19 and screw shaft 6 in order that feeding action between them will cause disc 19 to reach its balance point in a reasonable length of time.

Although the drawings and the foregoing description set forth highly desirable and preferred means for giving effect to the present invention, it is to be understood that the drawings and descriptive matter are to be interpreted in an illustrative rather than a limiting sense since various modifications and substitutions of equivalents may be made by those skilled in the art without departure from the invention as defined in the appended claim.

I claim:

Apparatus for indicating speed differentials between two rotating elements comprising primary and secondary shafts adapted to be rotated respectively at angular velocities proportional to those of the elements, a disc mounted for rotation on an axis normal to the axis of rotation of said secondary shaft, means operatively connecting said primary shaft and said disc for rotating said disc at the same angular velocity as said primary shaft, said secondary shaft having a screw threaded portion, a second disc threadedly engaged with said screw threaded portion and having its circumferential edge in engagement with the face of said first disc to be driven thereby, said second disc shifting radially with respect to said first disc and longitudinally with respect to said secondary shaft on changes of speed differential between said shafts, a clutch in said secondary shaft having a driving clutch element and a driven clutch element, the latter being joined to the screw threaded portion of the shaft, said clutch elements being positively engaged during normal operation of the apparatus and having a ratchet connection which enables said driving clutch element to overrun said driven clutch element when the clutch is disengaged but prevents said driven clutch element from rotating faster than said driving clutch element, a yoke carried by said second disc and being shiftable therewith, means for indicating the relative position of said yoke and said second disc and thereby showing speed differentials between said shafts, electromagnetic means for operating said clutch, and a limit switch which said yoke engages when said second disc shifts to the outer edge of said first disc on an extreme speed differential between said shafts and being electrically connected with said electromagnetic means, said limit switch and said electromagnetic means operating to disengage said clutch and permit said driving clutch element to overrun said driven clutch element on engagement of said yoke with said limit switch, disengagement of the yoke from the limit switch automatically re-engaging said clutch.

FORREST R. EDDY.

REFERENCES CITED

The following references are of record in the file of this patent:

UNITED STATES PATENTS

| Number | Name | Date |
|---|---|---|
| 466,214 | Behr | Dec. 29, 1891 |
| 864,379 | Junghans | Aug. 27, 1907 |
| 955,081 | Kaiser | Apr. 12, 1910 |
| 1,273,932 | Schlatter | July 30, 1918 |
| 1,983,093 | Montgomery | Dec. 4, 1934 |
| 2,109,482 | Hillix | Mar. 1, 1938 |
| 2,132,911 | Wellton | Oct. 11, 1938 |
| 2,158,137 | McConnell | May 16, 1939 |
| 2,375,422 | Leland | May 8, 1945 |

FOREIGN PATENTS

| Number | Country | Date |
|---|---|---|
| 458,953 | Great Britain | Dec. 30, 1936 |